J. W. WILCOX.
METHOD OF PREVENTING CORROSION OF STEAM BOILERS, VATS, TANKS, &c.
No. 34,455. Patented Feb. 18, 1862.
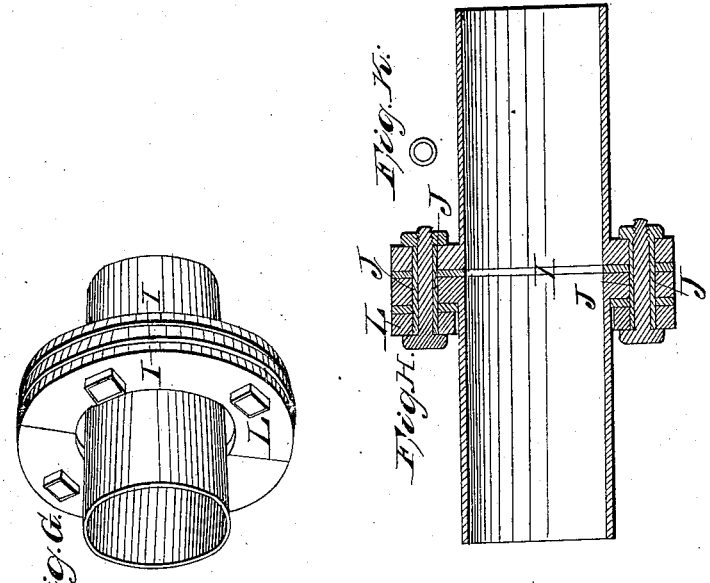
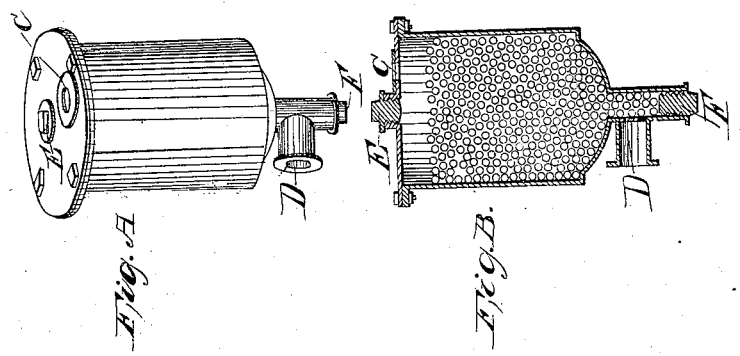

UNITED STATES PATENT OFFICE.

JOHN W. WILCOX, OF WEST ROXBURY, MASSACHUSETTS.

IMPROVED MODE OF PREVENTING CORROSION OF STEAM BOILERS, VATS, TANKS, &c.

Specification forming part of Letters Patent No. 34,455, dated February 18, 1862.

*To all whom it may concern:*

Be it known that I, JOHN W. WILCOX, of West Roxbury, in the county of Norfolk, in the State of Massachusetts, have invented a new and Improved Mode of Preventing Iron Boilers, Tanks, Vats, &c., from Wearing Out or being Destroyed by Galvanic Action; and I do hereby declare that the following is a full and exact description thereof, reference being had to the accompanying drawings, and the letters of reference marked thereon.

The nature of my invention consists in placing between the iron boiler, tank, or vat, and other metals negative to iron, and communicating with it, insulating-joints fitted with any non-conducting substance, such as rubber packing; and, also, in causing the water before it enters such boiler, tank, or vat to pass through a vessel containing zinc or its equivalent in galvanic properties in such a manner that the water be brought so into contact with the zinc as to be freed from all the copper and other metals negative to iron held by it in solution in the form of salts, which is an active agent in the premature destruction of steam-boilers and other iron vessels to which water and negative metals hold like relations.

To enable others skilled in the art to make and use my invention, I will proceed to describe its construction and operation.

Figure A is a tank filled or partly filled with shotted zinc, say about the size of musket-balls, as shown at Fig. B, which is a longitudinal section of the same. This tank should be always so placed that water containing the salts of copper, which may arise from the use of surface-condensers or otherwise, may pass through and be brought into such relation to the zinc as to insure its purification from injurious salts, so that the water may enter the boiler free from any metallic salts destructive to iron, for as the water must pass or, as it were, filter through the shotted zinc, all the metals held by the water in solution which would be injurious to iron are precipitated by the zinc in a metallic state, and there retained.

The tank, case, or filter is not limited to any particular mode of construction, but may be fitted both in size and form to suit the wants of the circumstances, observing, always, that the water be so admitted to and drawn from the tank as to insure it sufficient contact with the zinc to purify it from the objectionable metallic salts.

In the tank as here shown the water enters at C and passes out at D. The plug E is an opening to introduce the shotted zinc, and the plug F an opening from which it can at any time be taken for the purpose of cleansing, which should be done whenever the zinc becomes foul from long use, which, in some waters, would be, perhaps, once every twenty-four hours, and in others once in thirty or forty days, depending, of course, upon the quantity of water used and the amount of metallic salts injurious to iron which the waters may contain. This much can be stated with certainty, that water at a temperature usual in such cases containing half an ounce of salts of copper to the gallon can be completely freed from the copper in about ninety seconds.

The cleansing of the zinc shot may be accomplished by shaking them in a basket, box, or revolving cylinder for about five minutes, and then rinsing with water.

Fig. G is a perspective view of the insulating-joint, and Fig. H a longitudinal section of the same, and is intended to prevent or break any electro-galvanic circuit or current that would otherwise exist between the boiler and the copper or brass fixtures. I I I I, Figs. G and H, are the rubber packings of the joints separating the copper and brass or other pipes from the iron; and J J J J J, Figs. H and K, is the insulating rubber packing of the bolts to prevent their contact with the metals which they fasten. L L are simply the parts of a metal collar formed in semicircles for the purpose of taking the place of washers for the bolt-heads.

Among the sources of galvanic action which are destructive to steam-boilers, tanks, or vats may be enumerated all the copper, brass, or other metallic surface negative to iron, in the form of steam or water pipes, pumps, condensers, faucets, and other fixtures. In the so called "surface-condenser" a large amount of copper or brass is used for the chilling and condensing surface, from the action of which is evolved much thermo-electricity, which is an active agent in producing the copper-salts above described, and the same water being used over and over again, the copper is constantly taken up in solution and carried in the form of salts into the boiler by the returning water, and the water, again passing off from the boiler to the condenser in the form of steam, leaves in the boiler all the salts which it is constantly carrying into it, thus constituting the boiler the medium of its own destruction by making it a galvanic battery, and the metallic connection of such condensers with the boiler and engine-cylinder should be broken by the insulators above described, bearing in mind to place the insulating-joint as near the chilled section as possible, so as to disconnect as much of the heated metal from the chilled as is practical.

I am aware that zinc has been used for the preservation of iron, and placed inside of steam-boilers to protect them from incrustation, &c.; but I do not know of its having been used to free the water from the salts of copper or other metals likely to produce injurious results before it enters the boiler.

Zinc placed inside of a boiler where the salts of copper exist in solution becomes an agent of mischief, instead of a protector, for it is plain that zinc so placed will soon become coated with metallic copper, thus forming a negative plate or surface, and at once establishing a galvanic current or action on such portions of the boiler as remain positive. Some particles of copper would become detached from the zinc, and, falling to the bottom, will form a precipitate of metallic copper, and again the copper would not all reach the zinc. A portion would be precipitated on the iron in the form of metallic copper, the same as if no zinc were near, making it evident that the safest method is to keep the salts of copper and other metals injurious to iron out of the boiler altogether.

The preservation of condensers is secured by breaking the thermo-electric current by the insulating-joint above described.

I am aware that it is common to precipitate metals from water holding them in solution by the introduction into such water of other metals or other salts; but I do not know of water having been so treated on its passage from the condenser to the boiler of a steam-engine as I here propose.

What I claim, therefore, and desire to secure by Letters Patent, is—

1. So purifying the water as it passes from the condenser to the boiler of the steam-engine as to free it from all metallic salts destructive to iron, in the manner substantially as described.

2. The rupture or breaking of any galvanic or electric current that would otherwise exist between the steam-boiler and all other connecting steam or water fixtures that may be composed of metals that are electro-negative to iron, substantially in the manner and for the purposes set forth.

J. W. WILCOX.

Witnesses:
CHAS. B. BOYLE,
ORIN W. FISKE.